United States Patent [19]

Fond

[11] Patent Number: 5,242,702
[45] Date of Patent: Sep. 7, 1993

[54] EXTRACTION OF COFFEE CONTAINED IN SEALED CARTRIDGES

[75] Inventor: Olivier Fond, Yverdon, Switzerland

[73] Assignee: Nestec S.A., Vevey, Switzerland

[21] Appl. No.: 724,600

[22] Filed: Jul. 2, 1991

[30] Foreign Application Priority Data

Jul. 27, 1990 [EP] European Pat. Off. .......... 90114401

[51] Int. Cl.$^5$ .............................................. A23F 5/26
[52] U.S. Cl. ..................... 426/433; 426/77; 426/112
[58] Field of Search ............ 426/77, 78, 79, 82, 426/84, 433, 112, 115; 99/295, 302 R, 302 FB, 307, 289; 222/325, 541, 83.5

[56] References Cited

U.S. PATENT DOCUMENTS

| | | |
|---|---|---|
| 2,451,195 | 10/1948 | Brown . |
| 2,899,886 | 8/1959 | Rodth . |
| 2,968,560 | 1/1961 | Goros .................. 426/115 |
| 3,260,190 | 7/1966 | Levinson ............. 222/83.5 |
| 3,292,527 | 12/1966 | Stasse ................. 426/77 |
| 3,295,998 | 1/1967 | Goros .................. 99/295 |
| 3,391,632 | 7/1968 | Colonna ............... 426/77 |
| 3,589,272 | 6/1971 | Bouladon et al. ...... 426/77 |
| 3,607,297 | 9/1971 | Fasano ................. 426/433 |
| 3,974,939 | 8/1976 | Melton et al. ......... 222/541 |
| 4,136,202 | 1/1979 | Favre .................. 426/77 |
| 4,158,329 | 6/1979 | McKnight .............. 426/80 |
| 4,724,752 | 2/1988 | Aliesch et al. ......... 99/302 R |
| 4,846,052 | 7/1989 | Favre et al. ........... 99/295 |

FOREIGN PATENT DOCUMENTS

| | | |
|---|---|---|
| 7430109 | 3/1976 | Fed. Rep. of Germany . |
| 1537031 | 8/1968 | France . |
| 2033190 | 12/1970 | France . |
| 2062337 | 6/1971 | France . |
| 2182167 | 12/1973 | France . |
| 2556323 | 6/1985 | France . |
| 2617389 | 1/1989 | France . |

*Primary Examiner*—Steven Weinstein
*Attorney, Agent, or Firm*—Vogt & O'Donnell

[57] ABSTRACT

Roast and ground coffee, which is contained in a sealed frustoconically shaped cartridge between a first cartridge face and a filter which separates the coffee from a second cartridge face, is extracted by first placing the cartridge in a holder to hold a rim of the cartridge so that the second face is adjacent a finger. The filter has a strength sufficient to withstand, without tearing, the pressure in the cartridge upon extraction, and the second face has a strength sufficient to deform and withstand, without tearing, a pressure in the cartridge upon extraction of greater than 1 bar but less than 10 bar. After placement of the cartridge, the first face is pierced with an injector, and a mixture of water and air is injected from the injector under a pressure of from 1 bar to 10 bar to deform the second face in a direction away from the filter and towards the finger to apply the second face against the finger to tear the second face to enable extraction liquid to flow from the cartridge.

4 Claims, 3 Drawing Sheets

EXTRACTION OF COFFEE CONTAINED IN SEALED CARTRIDGES

BACKGROUND OF THE INVENTION

This invention relates to a process for extracting sealed cartridges containing roasted and ground coffee, said cartridge being substantially in the form of a frustum or inverted frustum comprising an upper face and a lower face on which a filter is placed. The present invention also relates to a device for carrying out this process.

There are several reasons for the use of coffee capsules, above all in the field of espresso type coffees which are extracted under pressure, which include hygiene, optimal storage of the coffee, ease of use, better control of the quality of the coffee obtained and good reproducibility of the extraction conditions. Among the number of capsules available, only sealed capsules which open under the pressure of the water injected respond more completely to the reasons listed above. These capsules are distinguished by their opening system.

Some of these capsules are designed with weakened zones which tear preferentially under the effect of pressure. This solution has the disadvantage of increasing the complexity and price of the capsule because the materials used have to be treated very precisely to ensure that the capsules open correctly and reproducibly.

Other capsules are used in a process in which, in a first step, weakened zones are formed in the lower membrane by mechanical action; in a second step, these weakened zones tear under the pressure of the water injected so that the capsule is opened. A process of this type, which is described in French Patent 1 537 031 and French Patent Application Publication No. 2 033 190, has numerous disadvantages.

Firstly, it is difficult to carry out because the upper and lower faces of the cavity of the device intended to receive the capsule are provided with a number of projections and holes.

In addition, this process is neither reliable nor reproducible because it is impossible to obtain all the desired openings under the effect of the water pressure because, as soon as one or more openings has/have been obtained, the pressure falls in the capsule because the liquid is able to flow out.

Accordingly, the number and position of the openings are uncertain. This situation can give rise to poor extraction of the layer of the substance because, since the filter is placed against the lower face, it is not able to drain over its entire surface. Extraction is incomplete and heterogeneous (zones with preferential passages and poorly irrigated and drained zones).

In addition, a process of the type in question is unsatisfactory from the point of view of hygiene because, in view of the multitude of orifices for the passage of the water and the high temperature of the device, deposits of organic materials must inevitably occur.

Finally, the process in question may be sensitive to choking because the successive deposits of organic materials in the multitude of small orifices can contribute to their gradual obstruction. Under these conditions, the quality and uniformity of the extractions are affected to an even greater extent.

Finally, the process in question is used with capsules containing a powder-form or liquid starting substance. In the case of coffee, it can only be soluble coffee, which has to be dissolved with water, or a concentrated liquid coffee which has to be diluted with water.

SUMMARY OF THE INVENTION

The problem addressed by the present invention was to provide a process and a device in which all the disadvantages mentioned above would be eliminated and which could be used for the extraction of ground coffee under pressure from a cartridge comprising an upper face and a lower face on which a filter is placed.

Accordingly, the present invention relates to a process in which a mixture of water and air under a pressure of 1 to 10 bar is injected through the upper face of the cartridge to move the lower face away from the filter in order to promote good flow over the entire surface of the filter, the lower face resting at its periphery on a rim and coming into contact during its deformation with a fixed central finger against which it tears to enable the liquid to be subsequently removed under a pressure of 2 to 20 bar.

The lower face enables the compartment in which the extract is collected to be formed by plastic deformation under the effect of the pressure of the extraction fluid. The lower face then tears on reaching its yield stress. Extraction can then begin, the liquid flowing through the opening. The pressure increases in the cartridge upstream of the filter under the effect of the loss of pressure from the liquid circulating through the layer of substance. The filter can deform elastically or plastically but, in any event, will not deform unless the membrane has deformed beforehand.

DETAILED DESCRIPTION OF THE INVENTION

The process according to the invention for extracting cartridges is perfectly reproducible. This is because, since the opening pressure of the lower face (between 1 and 10 bar and preferably 2.5 bar) can be lower than the extraction pressure (between 2 and 20 bar and preferably between 8 and 15 bar), the lower face will always be correctly deformed and opened to form a compartment for collecting and removing the coffee extract, thus promoting good extraction.

The cartridge used to carry out the process according to the invention is frustoconical in shape with a diameter of 2.5 to 6 cm and contains a thickness of the coffee layer of 10 to 25 mm. It is preferably made of aluminium or plastic. To reduce the wall thickness of the filter during extraction, radial fins surrounding the fixed central finger are provided.

Under the effect of pressure, the lower face and the filter bear against the radial fins. Because it is able to deform freely under pressure, the surface of the filter is reduced, being confined to sectors of a circle and not to the entire surface. On the other hand, the permanent deformation of these sectors creates a reinforcing structure for the filter (beads) at the place where the radial fins are situated, so that the moment of inertia of the filter is increased, providing it with greater mechanical strength which affords the possibility of reducing its thickness without, however, leading to tearing of its structure. The filter has a thickness in the range from 100 to 300 $\mu$m where the cartridge is made of aluminium and in the range from 300 to 1,000 $\mu$m where the cartridge is made of plastic.

Since, in the cartridge to be extracted, the layer of coffee is not very thick, it is preferable to inject the water upwards beneath the upper face of the cartridge so that the entire layer of coffee is thoroughly wetted, for example using the device according to the applicant's European patent application filed on the same date as the present application under the title "A device for the extraction of sealed cartridges" (EP 90114402.2).

As described in European Application EP 90114402.2, and in its corresponding U.S. counterpart, application Ser. No. 07/724,604, the device comprises a tightening ring with tightening ramps for the cartridge holder, an injector coaxial with the tightening ring and, around the periphery of the injector, a circular surface perpendicular to the injector and designed to ensure imperviousness on the upper face of the cartridge during its extraction.

The circular surface may be completely flat, above all if the cartridge to be extracted has a flat upper face. It may also have a circular bore concentric with the injector, particularly in cases when the cartridge to be extracted has a curved upper face. In all events, the surface is always flat in the zone where the imperviousness of the cartridge is established, i.e., in the zone close to the periphery of the cartridge to guarantee imperviousness.

The injector consists of an injection needle which performs the dual function of perforating the upper face of the cartridge and injecting water. The injector comprises between one and ten, and preferably between four and eight, holes uniformly distributed around the periphery of the injector and optionally at two levels. The axis of the holes of the injector forms an angle of from 0° to 25° with the horizontal. "Horizontal" is meant to be the plane formed by the flat circular surface. "Angle" is meant to be the angle formed above the plane of the horizontal.

By virtue of the geometry of the holes of the needle, the water is thus directed towards the top of the cartridge so that is uniformly distributed over the entire surface of the cartridge after deflection at the top of the cartridge.

The orientation of the holes of the injection needle is favorable because it permits the use of cartridges having variable sizes and height-to-diameter ratios, more particularly with small values (from 1 to 0.12), and relatively lightly compacted layers of coffee. This is because, by being directed slightly upwards, the water injected through the few holes of the needle is deflected in the upper zone of the cartridge and is returned towards the layer of coffee in far more dispersed form. Thus, the water comes into contact with the layer of coffee after partial dispersion and is no longer in the form of a few localized jets. This phenomenon is important during the first few seconds of the extraction process when the layer of coffee is not stabilized.

In addition, the dispersion of water is favorable if it is desired to obtain a dispersion and reduction of the kinetic energy of the water injected so that the layer of coffee is not excessively compacted, thus avoiding any risk of the layer of coffee choking under excessive pressure. By being lightly compacted, the layer of coffee moves from its place in the cartridge which is then taken by the water. During the remainder of the extraction process, the jets of water then are released more or less into this volume of water and, in no case, are the jets directed directly into the coffee.

The holes of the injector are between 0.2 and 1.5 mm in diameter. They must be long enough to allow the water to arrive under a pressure as high as 20 bar, but must not be too large in order to avoid any risk of reflux of the coffee grounds in completion of extraction.

To be sure of good penetration of the water into the cartridge during the extraction process, the holes of the injector are situated at a distance of 3 to 8 mm from the circular surface.

The distance between the bottom of the injector and the lower edge of the tightening ramp is at least equal to the thickness of the tightening ramp, for example at least 5 mm and as much as 25 mm, depending on the configurations of the cartridge holders and the cartridges. The object is to ensure both minimal and the cleanest possible tearing of the upper face of the cartridge to be extracted to avoid soiling of the extraction device with coffee grounds during release of the cartridge after extraction.

The cartridge is held in the extraction device by means of a cartridge holder of which the internal geometry is variable according to the size of the cartridges used. It comprises two diametrically opposite retaining lugs designed to cooperate with the tightening ramps of the tightening ring. The opening of the tightening ramps should be the smallest possible, in relation to the width of the retaining lugs of the cartridge holder, to promote better centering of the capsule before it is perforated by the water injector.

After the cartridge holder has been secured in the tightening ring, the imperviousness of the extraction device is established by compression of the outer ring of the cartridges against the flat circular surface of the device according to the invention. This circular surface is made of a material which ensures high impermeability, i.e., either a flexible material, such as natural or synthetic rubber, or a rigid material, such as INOX coated with PTFE (TEFLON) or filled PTFE.

The use of several types or sizes of cartridges from one and the same extraction device is made possible by using cartridge holders of which the inner part is specific to the capsule while the outer part, common to all types, is compatible with the tightening ring.

It is also possible to extract open cartridges, for example those object of the EP Patent Application No. 90114405.5.

After extraction, the capsules are easily released by loosening the cartridge holder and releasing the capsule simply by inverting the capsule holder.

Before the beginning of extraction, the fixed central finger is situated beneath the lower wall of the cartridge to be extracted at a distance of 0 to 5 mm and preferably 2 to 3 mm from the lower face.

The present invention also relates to a device for carrying out the process, comprising a water injector, a tightening ring with two tightening ramps coaxial with the water injector and a cartridge holder with two diametrically opposite retaining lugs designed to cooperate with the tightening ramps of the tightening ring, the cartridge holder comprising a substantially cylindrical recess with a lower peripheral rim for the cartridge to be extracted and, beneath the recess, a fixed central finger.

The expression "substantially cylindrical" is also intended to include a frustoconical form. The lower peripheral rim has a width of 1 to 4 mm. The function of this rim is to act as a support for the periphery of the cartridge to be extracted so that the filter withstands the increase in pressure and performs its function through the extraction process.

In a second embodiment, the device according to the invention additionally comprises an annular element with an inner recess of which the shape substantially corresponds to the outer shape of the cartridge to be extracted and an outer contour with which the cartridge holder is designed to engage.

The recess of the cartridge holder is variable in size according to the size of the cartridge to be extracted.

In the first embodiment of the device according to the invention, the cartridge to be extracted has an upper face larger in diameter than the lower face and vice versa in the second embodiment, i.e., the cartridge has a lower face larger in diameter than the upper face.

The extraction of the cartridge thus takes place in the following order and under the following conditions:
  introduction into the extraction device, tightening of the cartridge holder, imperviousness being established by compression of the upper circular rim of the cartridge between the upper edge of the cartridge holder and the extraction device;
  piercing of the cartridge;
  injection of water into the upper part of the cartridge;
  plastic deformation of the lower face under the effect of the water pressure up to the yield stress of the lower face so that it opens; and
  plastic deformation of the filter under the effect of the hydrostatic pressure generated by the drop in pressure of the layer of substance contained in the cartridge and the filter, this deformation being less pronounced than that of the lower face, so that a collecting compartment is maintained, and not, reaching the yield stress despite a possibly higher pressure than the previous pressure which resulted in opening of the lower face.

The fixed central finger is a cylindrical or cylindroconical element (circular or oval cross-section) placed beneath the cartridge which produces a local concentration of tension in the lower face and promotes perfectly controlled opening of the lower face of the cartridge. The finger is between 2 and 10 mm in diameter.

The finger has a dual role, namely, on the one hand, it opens the cartridge and, on the other hand, it acts as a support for the filter. Through its presence at the centre of the extraction device, the finger provides an additional support for the filter, thus reducing the deformation of the filter so that its thickness may be reduced. The thickness of the filter is selected so that it can bear against the finger without tearing. The filter normally has a thickness of 100 to 1,000 μm and is welded at its periphery to the lower face of the cartridge.

As mentioned above, the cartridge holder comprises radial fins surrounding the fixed central finger beneath the recess in order to limit the thickness of the filter. The radial fins are between 3 and 8 in number. Their thickness varies from 0.5 to 2 mm and their shape is rounded in order not to tear the combined filter/lower wall region. To ensure a good flow of the coffee extract, the upper edge of the radial fins forms an angle of 5° to 20° with the horizontal.

The cartridge used in accordance with the invention may be used with a loose filter or with a filter welded to or crimped with the lower face.

The invention is described in more detail with reference to the accompanying drawings.

DETAILED DESCRIPTION OF THE DRAWINGS

Figure 1:
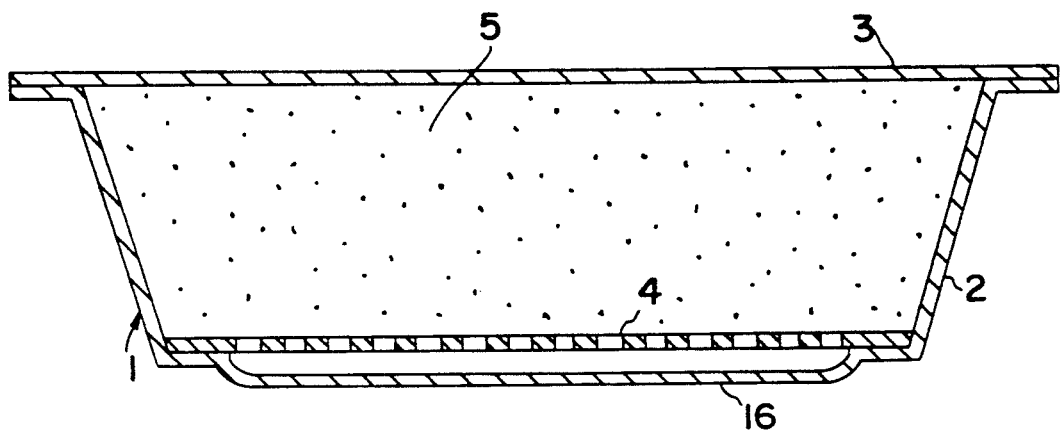
FIG. 1 diagrammatically illustrates the cartridge to be extracted.

The cartridge (1) comprises a cup (2) frustoconical in shape to which a filter (4) is welded. The ground and roasted coffee (5) to be extracted is placed on the filter. The cartridge is closed with a lid (3) forming the upper face, and the lower face (16) of the cartridge is not in direct contact with the filter (4).

The cartridge (1) is introduced into the extraction system (6) comprising a water injector (7), a tightening ring (8) with tightening ramps (9) and a cartridge holder (10) with two retaining lugs (11) designed to cooperate with the ramps (9). The cartridge holder comprises a recess for the cartridge with a lower peripheral rim (25) and, beneath this recess, a fixed central finger (12) and radial fins (13) which support the lower face (16) and the filter (4) of the cartridge to be extracted. The handle (14) provides for easy handling of the cartridge holder.

Figure 2:
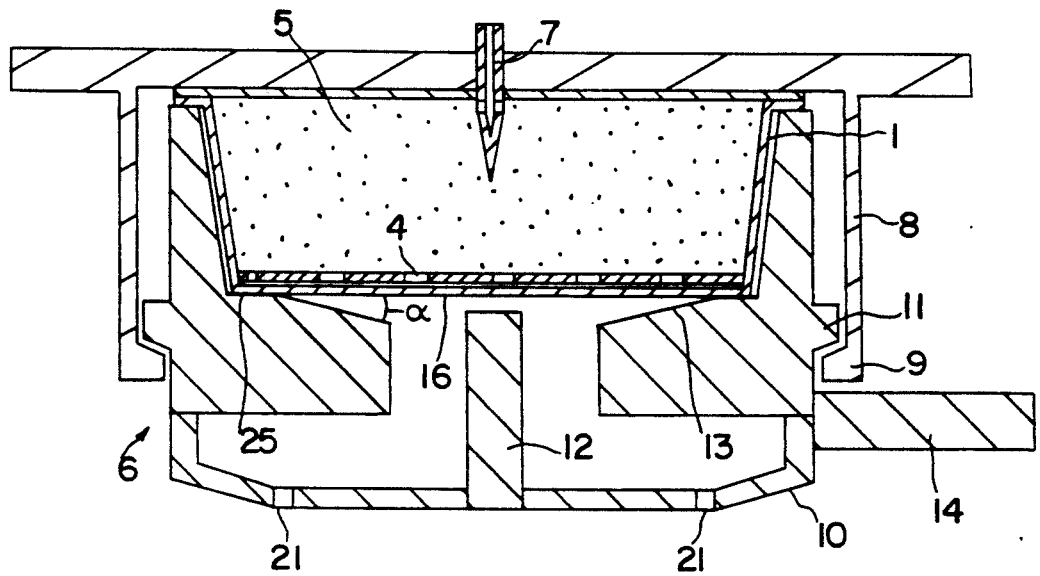
FIG. 2 is a section through the cartridge in the extraction device according to the invention.
Figure 3:
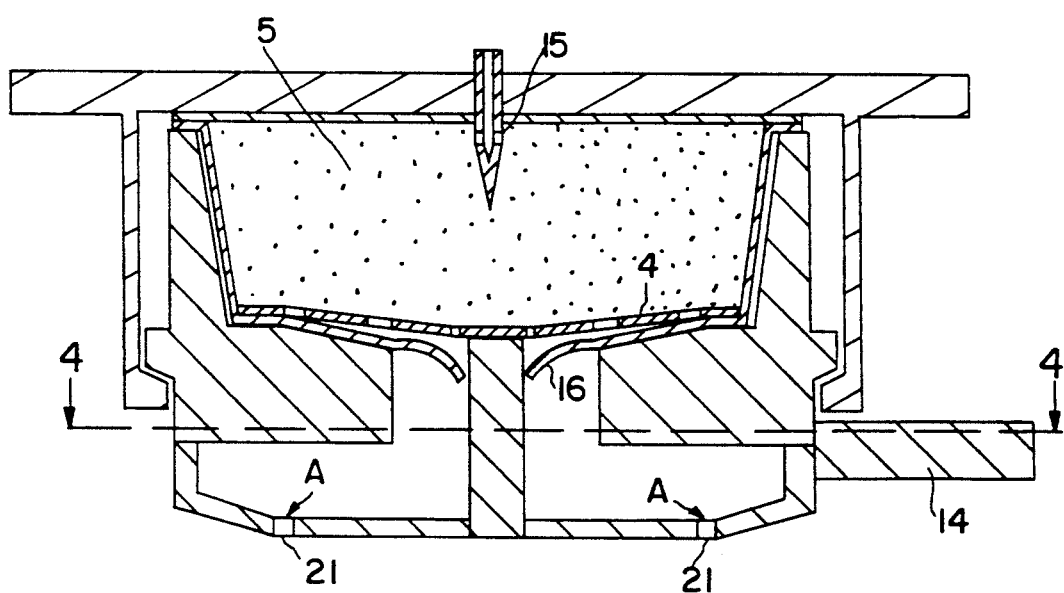
FIG. 3 is a section corresponding to FIG. 2 during the actual extraction process.

FIG. 2 shows the cartridge and the extraction system before the injection of water. FIG. 3 shows that actual extraction process. FIG. 2 clearly shows the angle α which the fins form with the horizontal.

The water arrives through the orifices (15) of the water injector and wets the entire layer of coffee (5). Under the effect of the water pressure, the lower face (16) of the cartridge deforms and is applied against the central finger (12). The wall tears on reaching its yield stress. The filter also deforms, but has such a thickness that it does not tear. The actual extraction process can then begin. The liquid flows through the openings in the direction of the arrows A and through the flow orifices (21) and the pressure builds up in the cartridge. The beverage is collected in a container (not shown). A cartridge is extracted in a time of 1 minute and a beverage having all the characteristics of an espresso coffee is obtained.

Figure 4:
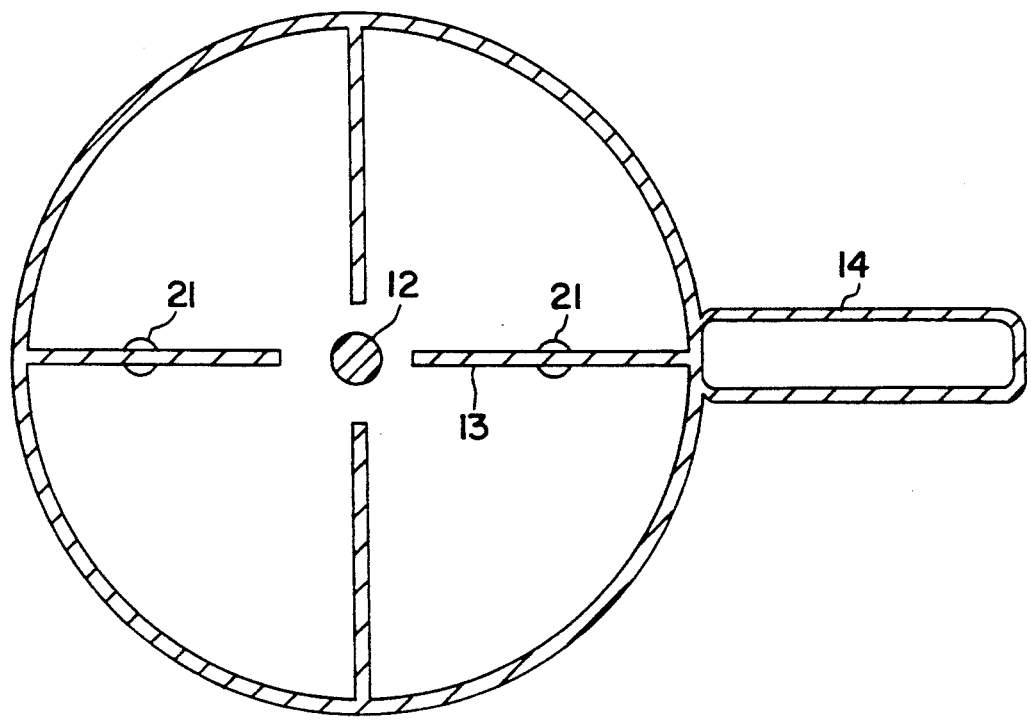
FIG. 4 is a section on the line 4—4 of FIG. 3.

In the Figures, the cartridge holder is shown with four radial fins, as can be seen more particularly in FIG. 4.

Figure 5:
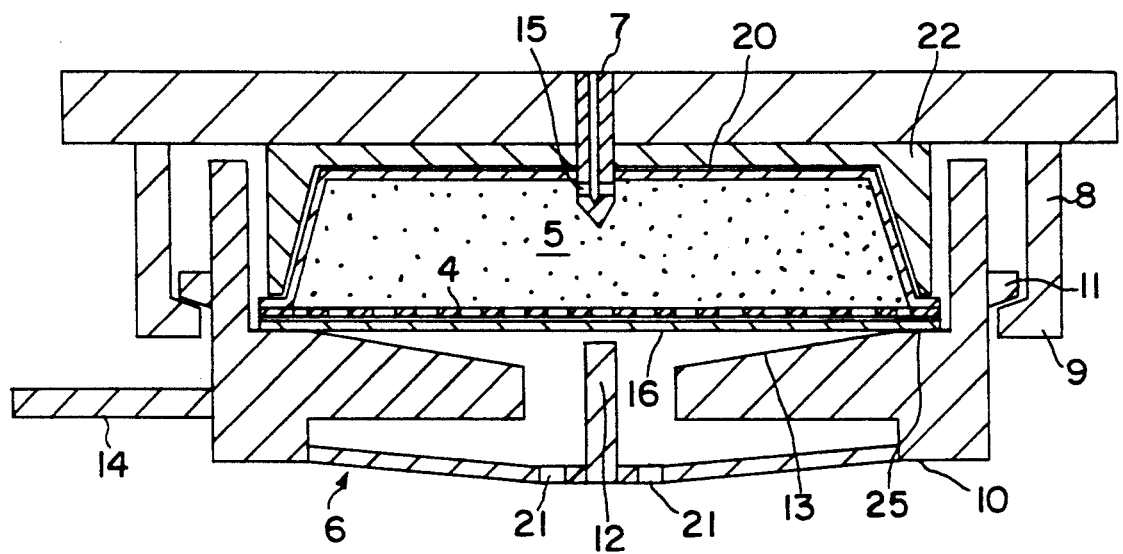
FIG. 5 is a section through a second embodiment of the device according to the invention.

In FIG. 5, the same elements as in FIG. 2 are denoted by the same reference numerals. The cartridge (20) containing the coffee (5) to be extracted differs in the respect that its lower face has a larger diameter than its upper face. The system additionally comprises an annular element (22) with an inner recess in which the cartridge (20) is accommodated and an outer contour with which the cartridge holder (10) engages. In other respects, the process by which the cartridge is extracted is the same as for FIGS. 2 and 3. Imperviousness of the cartridge during its extraction is established by compression of the edges of the capsule between the cartridge holder and the extraction system.

I claim:

1. A process for extracting roast and ground coffee contained in a sealed cartridge comprising:
  placing a cartridge, wherein the cartridge has a frustoconical shape and contains roast and ground coffee between a first cartridge face and a cartridge filter which separates the coffee from a second cartridge face, in a holder to support each of the second face and filter at their peripheries and so that the second face is positioned at a distance of up to 5 mm from a finger which is substantially centrally positioned relative to the second face, wherein the second face has a strength sufficient to deform and withstand, without tearing, a pressure in the cartridge upon extraction of greater than 1 bar but less than 10 bar; and piercing the first face with an injector and injecting a mixture of water and air from the injector under a pressure of from 1 bar to 10 bar into the cartridge and coffee to deform the second face in a direction away from the filter and towards the finger such that the second face is applied against the finger, against which it tears, to enable extraction liquid to flow through the filter without tearing the filter, and out the cartridge.

2. A process according to claim 1 wherein the water and air are injected in a direction towards the first face.

3. A process according to claim 1 wherein, prior to the piercing step, the second face is spaced at a distance of from 2 mm to 3 mm from the finger.

4. A process according to claim 1 wherein the cartridge has a diameter of from 2.5 cm to 6 cm and the finger has a cylindriconical shape having a diameter of from 2 mm to 10 mm.

* * * * *